(12) United States Patent
Patel

(10) Patent No.: US 12,081,103 B2
(45) Date of Patent: Sep. 3, 2024

(54) MODIFIED MAGNETIC LEVITATION SYSTEM FOR FLYING VEHICLE

(71) Applicant: Harshad Babulal Patel, Gujarat (IN)

(72) Inventor: Harshad Babulal Patel, Gujarat (IN)

(*) Notice: Subject to any disclaimer, the term of this patent is extended or adjusted under 35 U.S.C. 154(b) by 246 days.

(21) Appl. No.: 17/770,861

(22) PCT Filed: Oct. 1, 2020

(86) PCT No.: PCT/IN2020/050846
§ 371 (c)(1),
(2) Date: Apr. 21, 2022

(87) PCT Pub. No.: WO2021/079377
PCT Pub. Date: Apr. 29, 2021

(65) Prior Publication Data
US 2022/0410722 A1   Dec. 29, 2022

(30) Foreign Application Priority Data

Oct. 22, 2019   (IN) .............................. 201921042882

(51) Int. Cl.
*H02K 7/09*       (2006.01)
*B64U 30/27*      (2023.01)
(Continued)

(52) U.S. Cl.
CPC ............... *H02K 7/09* (2013.01); *B64U 30/27* (2023.01); *H02K 1/2792* (2022.01);
(Continued)

(58) Field of Classification Search
CPC ........ H02K 7/09; H02K 1/2792; B64U 30/27; B64U 50/19; B60L 2200/10; Y02T 10/64
(Continued)

(56) References Cited

U.S. PATENT DOCUMENTS 9,148,077 B2   9/2015   Henderson

FOREIGN PATENT DOCUMENTS

CN   103939523 B   10/2015
CN   106012716 A   10/2016
(Continued)

OTHER PUBLICATIONS

English abstract of CN103939523B.
(Continued)

*Primary Examiner* — Terrance L Kenerly
(74) *Attorney, Agent, or Firm* — Caesar Rivise, PC

(57) ABSTRACT

Modified magnetic levitation system for flying vehicle Modified magnetic levitation system for flying vehicle includes a propeller system (11, 12, 13), an axial levitation system (101, 102), radial levitation system (part of 201), rotary propulsion system (part of 201) and passive magnetic bearing system (301). An axial levitation system includes plurality of halbach array pairs connected on rotor and special short circuited coil windings connected on stator. A propulsion mechanism (part of 201) is provided for rotating rotor along the centre axis. Radial levitation and propulsion system (201) includes halbach arrays (53) located at outer circumference of rotor and interweaved active and passive coil windings (43) located at inner circumference of stator. Passive magnetic bearing system (301) includes parts of rotor and stator around centre axis of the system. Passive magnetic bearing (PMB) is utilized to levitate rotor at rest, below lift-off speed, and start and end condition of rotations.

9 Claims, 5 Drawing Sheets

(51) Int. Cl.
  *H02K 1/2792* (2022.01)
  *B64U 50/19* (2023.01)
(52) U.S. Cl.
  CPC ........... *B60L 2200/10* (2013.01); *B64U 50/19* (2023.01); *Y02T 10/64* (2013.01)
(58) Field of Classification Search
  USPC ....................................................... 310/90.5
  See application file for complete search history.

(56) References Cited

FOREIGN PATENT DOCUMENTS

| | | | |
|---|---|---|---|
| KR | 1020120056656 A | 6/2012 | |
| KR | 101264224 B | 5/2013 | |

OTHER PUBLICATIONS

English abstract of KR1020120056656A.
English abstract of CN106012716A.
International Search Report from corresponding PCT/IN2020/050846 mailed Dec. 21, 2020.
CN103939523B, English Abstract.
KR1020120056656A, English Abstract.
CN106012716A, English Abstract.
KR101264224B1, English Translation.

MODIFIED MAGNETIC LEVITATION SYSTEM FOR FLYING VEHICLE

CROSS-REFERENCE TO RELATED APPLICATIONS

This application is a U.S. National Phase Application of PCT/IN2020/050846, filed Oct. 1, 2020, which claims priority to IN 201921042882, filed Oct. 22, 2019, the contents of which applications are incorporated herein by reference in their entireties for all purposes.

FIELD OF THE INVENTION

The present invention relates to a magnetic levitation system and more particularly it relates to a modified magnetic levitation system for all electrical flying vehicles and flights that provides a frictionless rotation and inherently stable levitation of propeller rotor and contact free load transfer of propeller thrust/air lift force to levitate vehicle load and also provides a pollution free, maintenance free and power efficient solution for enhancing flying time and increased load capacity for flying vehicles and flights with provided electrical power source.

BACKGROUND OF THE INVENTION

Today, Unmanned/Manned Aerial Vehicle ("UAV") (i.e. drone, passenger carrying quad copter, multi copter) technologies are becoming increasingly popular in a broad range of applications. Nowadays, UAVs are in great demand as the UAVs can perform more and more missions. UASs (unmanned aircraft systems) or drones are remotely piloted or self-piloted aircraft that can carry various items, such as cameras, sensors, communication equipments, etc. Drones can vary greatly in terms of size and functionality. Further, passenger carrying Drones are also unveiled in many countries.

Regardless of size, drones generally includes a propeller fan, a rotary propulsion system, a power source for powering the propulsion system, a steering mechanism, a controller including a remote communication system, and a frame maintaining all these components. The vertical takeoff in such aerial vehicle is achieved on the principle of motorized propeller fans. While rotating Propeller fan generates air thrust/lift force to lift flying vehicle vertically against gravitational force and/or any other force.

Currently, despite of many research and developments, such aerial vehicles has basic limitation in form of its flight time. The great impediment in extended period of flying time is friction and motor losses. In the technology of motorized propeller fan, friction in bearings and eddy current losses in coil ferromagnetic cores are great impediment to the efficacy of motor. In rotating systems like motors, mechanical losses created by mechanical bearings greatly reduce the overall performance. Bearings are a major source of friction and heat within a motor.

A combination of coreless motor construction and frictionless rotor support system can be reasonable solution of this problem. Very strong magnetic field is required to solve these two issues. Halbach array comprise the most efficient way to employ permanent magnet material for the generation of very strong periodic magnetic field. The beauty of the concept is that the effect of the cross-magnetized magnet bars in the array is to enhance the periodic magnetic field at the front face of the array, while canceling it at back face of the array. Not only is the field enhanced, but analysis shows that in a long array the horizontal and vertical components are nearly purely sinusoidal in their spatial variation, with negligible higher spatial harmonics. If the Halbach array is then fabricated from high-field permanent-magnet material, Such as NdFeB, peak fields near the front face of the array of order 1.0 Tesla are possible.

This very strong periodic magnetic field interacting with current carrying propulsion coils can be deployed to generate propulsion force for rotor. Moving halbach array in vicinity of special short circuited coil windings can generate very strong levitating force. Yet there are some limitations for structure with single halbach array. One can increase lift-to-drag ratio up to certain extent with limitations of rotor size and rotor speed.

All electric flying vehicles can vary from very small size to very big size according to areas of application. In some applications high levitation forces require with limitations of rotor size. In other applications there may be limitations of rotor speed also.

Various attempts have been done to increase lift-to-drag ratio and enhance the flying time of flying vehicle by changing various parameters of the vehicle.

Thereof, there is containing & unmet need for improving in magnetic levitation system that substantially increase lift force and enhance the flying time of flying vehicles.

OBJECT OF THE INVENTION

The main object of the present invention is to provide pollution free, maintenance free and power efficient solution for all electrical flying vehicles and flights, with increased lift force and low power consumption.

Another object of the present invention to provide a magnet configuration comprising a pair of Halbach arrays magnetically and structurally connected together and a winding located in between such that when the pair of Halbach arrays rotates along the windings, a current is induced in the windings and repelling force is exerted on the pair of Halbach arrays.

Yet another object of the present invention is to provide in-phase positioning (like poles aligned) of the first halbach array with respect to the second halbach array. This provides vertical components of their fields tend to cancel between them, while their horizontal components add. Thus, horizontal field maximizes and vertical field minimizes in the area covered by windings.

Further object of the invention is to attach levitation and propulsion halbach array magnets to a rotor.

Yet another object of the invention is to provide levitation and propulsion windings on the stator.

Yet another object of the invention is to provide windings such that the winding plane is normal to the centre plane of halbach array pair.

Yet another object of the invention is to provide a pair of Halbach arrays that when rotating, have a characteristic lift-to-drag ratio at operating loads that can be controlled by changing distance (dy) between halbach array pairs, and/or width, and/or thickness of magnets.

Yet another object of the invention is to provide plurality of halbach array pairs and windings to increase axial lift force.

Another object of the invention is to provide Passive magnetic bearing (PMB) rotor and stator around centre axis of the system.

Yet another object of the invention is to provide axial offset (dx) between PMB stator and rotor such that rotor is exerted downward force when it is positioned axially at the centre of the system due to axial levitation equilibrium.

Yet another object of the invention is to provide this downward force of rotor to compensate (fully or partially) weight of the vehicle body.

Yet another object of the invention is to attach vehicle body with stator.

Yet another object of the invention is to provide passive magnetic bearing (PMB) to levitate rotor at rest, below lift-off speed, and at start and at end of rotations.

These and other objects will be apparent based on the disclosure herein.

SUMMARY OF THE INVENTION

The Present invention relates to a Modified Magnetic Levitation System for Flying Vehicle wherein dual halbach array axial levitation system, propeller rotor system, motorized propulsion system, radial levitation system and permanent magnetic bearing system along with thrust bearing are incorporated to build modified magnetic levitation system for all electric flights and flying vehicles. Air thrust/lift force generated by rotating propeller blades is transferred to stator and vehicle body in contact free manner.

Here, dual halbach arrays are used, one above and one below with respect to the windings, arranged 'In Phase' (like poles align) with respect to each other. Important gains result from the use of dual halbach arrays: First, the levitating (horizontal) component of the magnetic field is approximately double that of a single array. This circumstance implies that double levitating force per unit area can be achieved with same current in the windings. Second, the lower array, when it is phased with respect to the upper array so as to increase the horizontal (levitating) magnetic field component, decreases the vertical field component (the component that is responsible for drag force), allowing maximum Lift-to-Drag ratio. In the present invention adjustment of required lift force is accomplished by adjusting the relative spacing (dy) between the arrays, and/or changing width and/or changing thickness of magnets. As a result not only is the levitating force increased, but the drag peak, occurring near the lift-off Speed, is also reduced by a comparable factor.

In the present invention, PMB is used to levitate rotor at rest and below lift-off speed. Here, axial offset (dx) provided between PMB stator and rotor such that rotor is exerted downward force when it is positioned axially at the centre of the system due to axial levitation equilibrium. This downward force of rotor is used to compensate (Fully or partially) weight of the vehicle body.

BRIEF DESCRIPTION OF THE DRAWINGS

Other objects, advantages and novel features of the invention will become apparent from the following detailed description of the present embodiment when taken in conjunction with the accompanying drawings.

Figure 1:
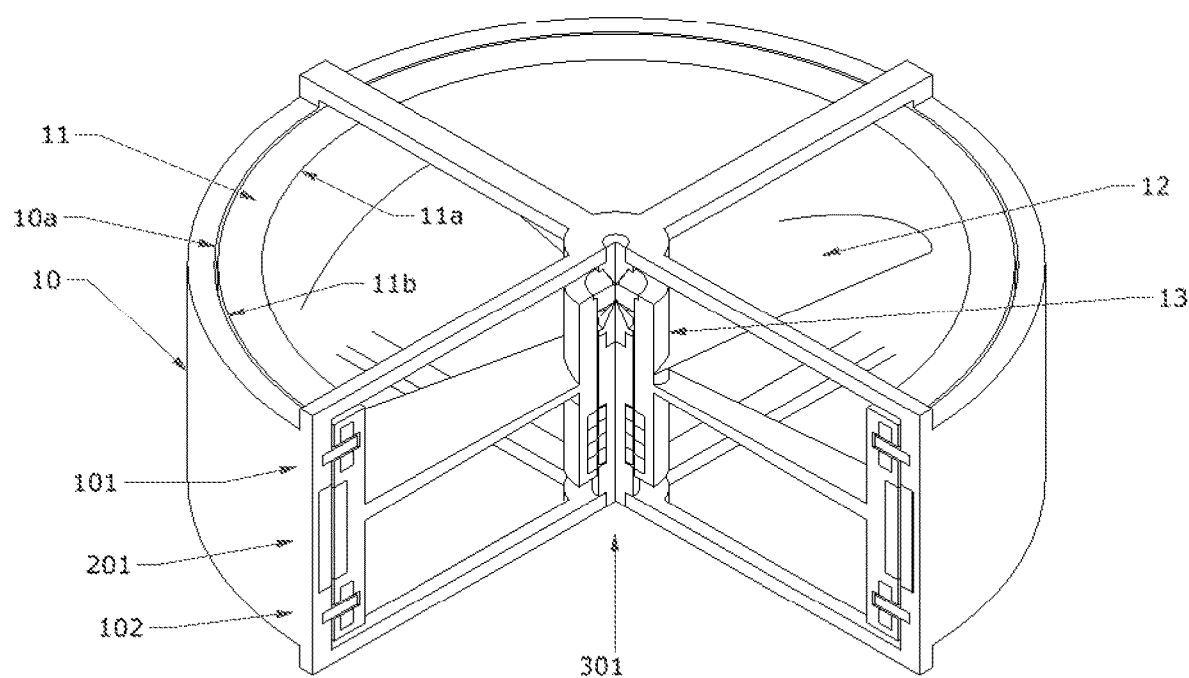
FIG. 1 illustrates a cut-away perspective view of the system for depicting construction of magnetic levitation system for all electric flying vehicles and flights according to present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE INVENTION

Before explaining the present invention in detail, it is to be understood that the invention is not limited in its application to the details of the construction and arrangement of parts illustrated in the accompanied drawings. The invention is capable of other embodiments, as depicted in different figures as described above and of being practiced or carried out in a variety of ways. It is to be understood that the phraseology and terminology employed herein is for the purpose of description and not of limitation.

It is to be also understood that the term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Further, the term "halbach array" means series of permanent magnetic elements wherein orientation of magnets results in cancellation of magnetic fields on one side of the array and produces a sinusoidally varying periodic magnetic field on the other side of the array. This configuration represents an optimally efficient use of magnetic material resulting in magnetic forces that theoretically approach the maximum force per unit area exerted by permanent magnets.

Further, the term "starting rotation" means the rotational speed of the rotor increasing from zero to lift-off speed. The term "ending rotation" means the rotational speed of the rotor decreasing from lift-off speed to zero. The term "lift-off speed" means the rotational speed of the rotor being achieved when half of maximum lifting force is produced between the rotor and the stator.

The present magnet configuration consists of pair of Halbach arrays connected on outer cylindrical surface (11b) side of the rotor (11). Between each array pair there is a special windings connected on the inner cylindrical surface (10a) side of stator (10). This winding is placed in such a way that the winding plane remains normal to the centre plane of halbach array pair. The Halbach arrays of the dual assembly are positioned in phase (like poles aligned) with respect to each other. The vertical components of their fields tend to cancel between them, while their horizontal components add. Thus, horizontal field maximizes and vertical field minimizes in the area covered by windings.

Figure 2:
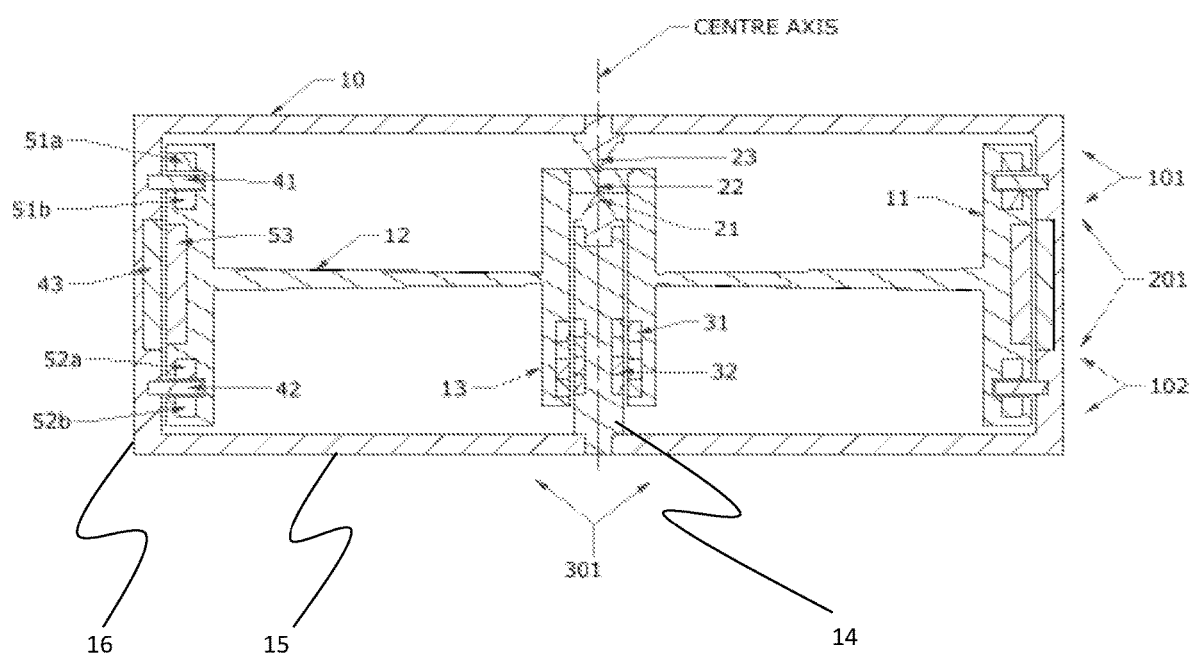
FIG. 2 illustrates a cross-sectional view at vertical plane passing from centre axis of modified magnetic levitation system according to the present invention.

Now, Referring to FIGS. 1 & 2 of the drawings, it generally designates an exemplary embodiment of a modified magnetic levitation system according to present invention.

Said magnetic levitation system consists of a hollow cylindrical type stator (10) and a rotor (11) being radially surrounded by said stator (10) with a uniform radial spacing between them, an axial levitation means (101 and 102) for suspension of rotor with axial stability, a radial levitation means (Part of 201) for suspension of rotor with radial stability, a propulsion system (Part of 201), preferably, but not limited to, brushless D.C. motor with coreless configuration for rotation of a rotor and a radial supporting means (301) preferably, but not limited to, passive magnetic bearing, and an axial supporting means (22 and 23) preferably, but not limited to, thrust bearings.

Further Referring to FIGS. 1 and 2, said rotor (11) consist of cylindrical surface (11*b*) being radially surrounded by said stator (10) with a uniform spacing between them, a central hub (13) being concentrically located within the rotor, a plurality of rotor blades (12) extends from inner cylindrical surface (11*a*) of the rotor (11) to the outer cylindrical surface of the hollow central hub (13). A central shaft (14) being axially extended within the central hub (13). The Central hub contains plurality of PMB rotor magnet rings (31) within it. The centre shaft (14) accommodated plurality of PMB stator magnet rings (32) that is being surrounded by said PMB rotor magnet rings (31). The centre shaft (14) supporting means (15) extends radially to stator base (16). The centre axis of stator (10) and rotor (11) coincide with each other.

Figure 3:
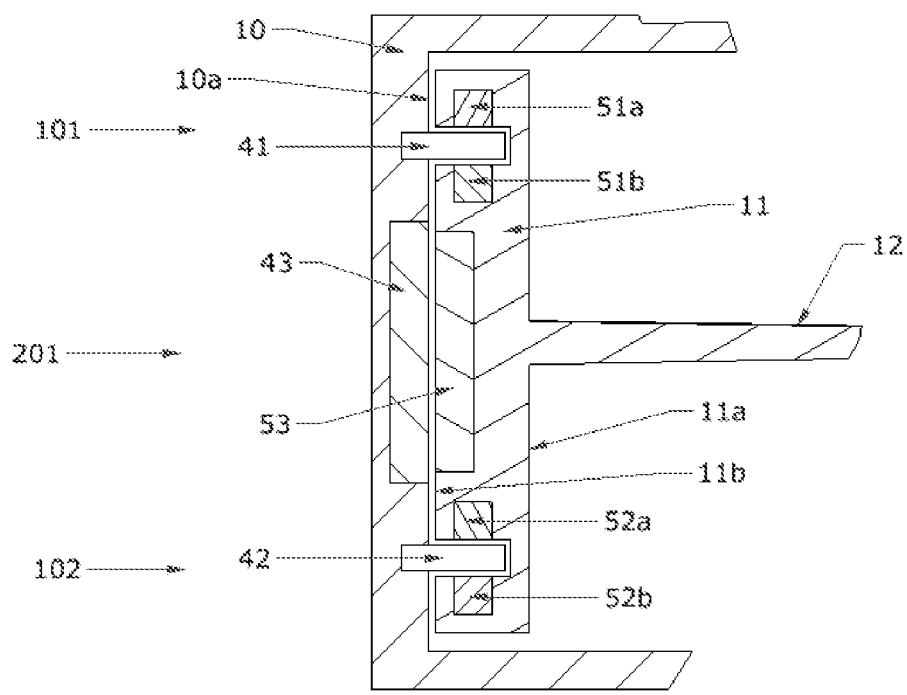
FIG. 3 illustrates a detailed view of FIG. 2 for depicting construction of propulsion system and levitation system being used in magnetic levitation system according to the present invention.

FIG. 3 illustrates a detailed view of FIG. 2 for depicting construction of axial levitation system (101,102), radial levitation system (part of 201) and propulsion system (part of 201) being used in magnetic levitation system according to the present invention. Axial levitation system comprises of halbach array pair (51*a*, 51*b* and 52*a*, 52*b*) and a closed pack short circuited coil winding (41 and 42) between the respective pair of halbach array. One Halbach array pair (51*a*, 51*b*) is located at upper end of outer diametric side of cylindrical surface (11*b*) of the rotor (11) and another Halbach array pair (52*a*, 52*b*) is located at lower end of outer diametric side of cylindrical surface (11*b*) of the rotor (11). Similarly one cantilevered winding (41) is located at upper end of inner diametric side of the cylindrical surface (10*a*) of the stator (10), and another cantilevered winding (42) is located at lower end of inner diametric side of the cylindrical surface (10*a*) of the stator (10). However, a vice versa configuration is also within the scope of the present invention. Both windings are placed in such a way that horizontal centre plane of winding aligns with respective halbach array pair centre plane.

It is to be noted that each said coil winding (41, 42) comprises a plurality of short circuited coil windings made of any suitable conducting material.

It is to be also noted that the person skilled in the art can conceive other type of configuration made from any conductive material that can electromagnetically respond to the time varying magnetic field produced by the halbach array located on each side of said winding. However, such modifications are also within the scope of the present invention. Combined radial levitation system and propulsion system comprises of radial halbach array (53) and interweaved radial levitation and propulsion winding circuits (43).

In radial halbach array permanent magnets are magnetically and structurally connected in such a way that strong magnetic field generates at outer diametric side of the halbach array. Radial halbach array (53) is located at the centre of outer diameter side of cylindrical surface (11*b*) of the rotor (11) whereas the winding circuit (43) is placed at the centre of inner cylindrical surface (10*a*) of the stator (10). However, a vice versa configuration is also within the scope of the present invention. Said winding circuit (43) is composed of two interwoven windings, one is active winding for propulsion of rotor whereas another is closed pack short circuited coil winding for radial levitation. When current is passed through active windings, magnetic field generated by the windings interacts with the magnetic field of halbach array to produce rotating force on rotor. Amplitude and direction of current is controlled using the controller and power electronic drive circuitry to optimize speed of rotor. Rotor position is detected by suitable positioning sensor including hall sensor, inductive sensor or any type suitable sensor. Simultaneously rotating magnetic field of halbach array induces current in passive windings. This induced current interacts back with magnetic field of halbach array to generate radial levitation force on rotor (11).

Figure 4:
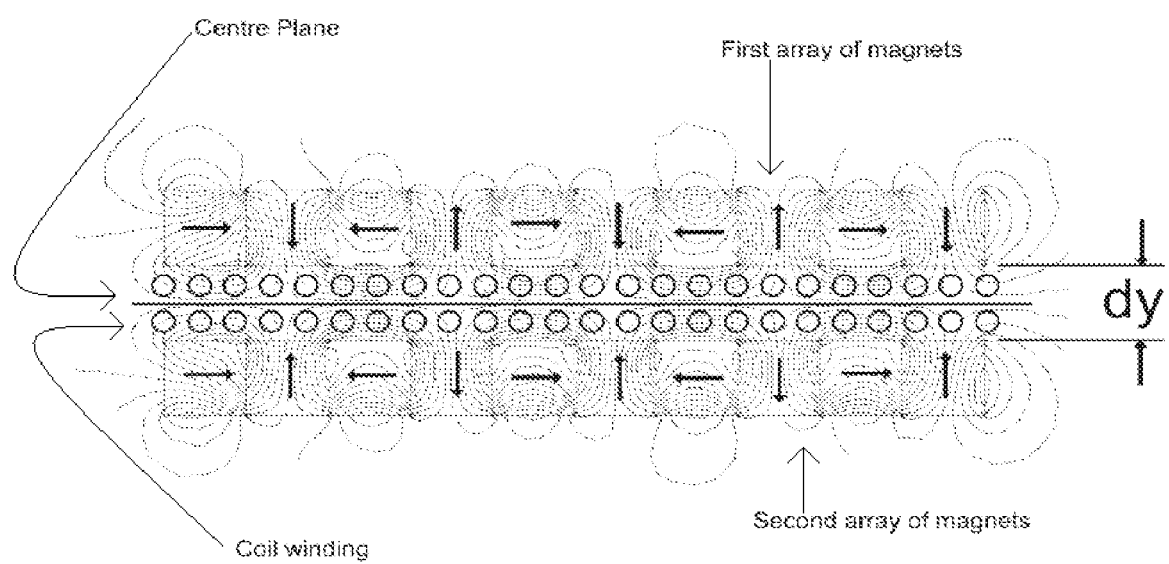
FIG. 4 illustrates positioning of axial levitation array pair with respect to each other and winding according to the present invention. It also illustrates distribution of magnetic field lines showing densed horizontal field lines and negligible vertical field lines.

FIG. 4 illustrates Perceptual Structure of electromagnetic field generated due to arrangement of dual halbach array according to the present invention. Second array of magnets (51*b*, 52*b*) oriented with respect to first array of magnets (51*a*, 52*a*) in such a way that like poles of respective arrays align with each other. This unique configuration diverts magnetic field lines parallel to the surface of halbach array. Thus vertical field components cancel each other and horizontal field components substantially double between pair of halbach array. Special winding (41, 42) of closed pack short circuited coil winding is placed between pair of halbach array such that winding plane remains normal to the centre plane of the halbach array pair.

When pair of halbach array (51*a*-51*b*, 52*a*-52*b*) rotates with respect to the winding, current is induced in the winding circuit (41, 42). This current then interacts back on the magnetic field of halbach array to produce a repelling force. Interaction of current with horizontal field produces lift force whereas with vertical field produces drag force. A major advantage of the present configuration is that the levitating (horizontal) component of the field is approximately doubled relative to a single array. This circumstance implies that double levitating force per unit area can be achieved with same current in the windings. Second, the lower halbach array, when it is phased with respect to the upper halbach array so as to increase the horizontal (levitating) magnetic field component, decreases the vertical magnetic field component (the component that is responsible for drag force), allowing maximum Lift-to-Drag ratio. As a result not only is the levitating force increased, but the drag peak, occurring near the lift-off Speed, is also reduced by a comparable factor.

Figure 5:
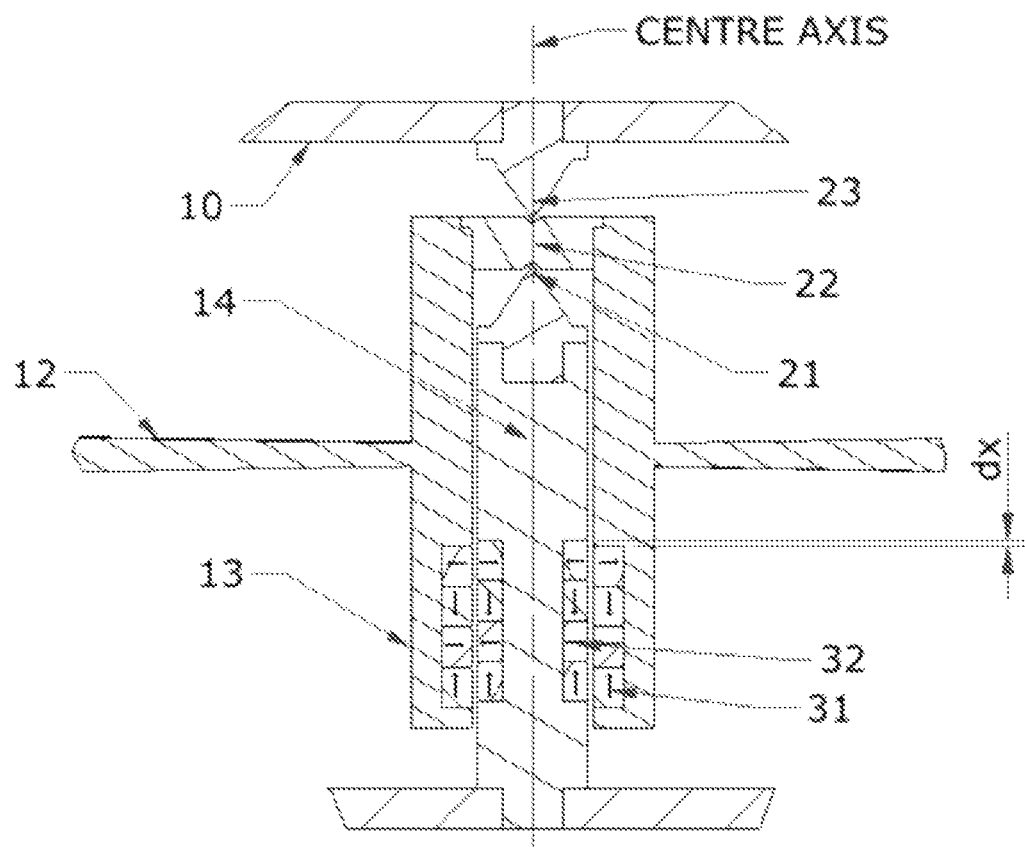
FIG. 5 illustrates a detailed view of FIG. 2 for depicting construction of passive magnetic bearing and an axial supporting means (thrust bearing) being used in magnetic levitation system according to the present invention.

FIG. 5 illustrates a detailed view of FIG. 2 for depicting construction of passive magnetic bearing and an axial supporting means (thrust bearing) being used in magnetic levitation system according to the present invention. Friction is mostly unwanted in rotating machines. In order to reduce its impact on the system, the integration of magnetic bearings is frequently regarded as a valid solution. PMB (Passive magnetic bearing) in conjunction with thrust bearing provides levitation to the rotor at rest, below lift-off-speed and at starting and ending of rotations. The Central hub (13) contains plurality of PMB rotor magnet rings (31) within it. Said centre shaft (14) accommodated plurality of PMB stator magnet rings (32) that is being surrounded by said PMB rotor magnet rings (31) with equal radial spacing. Said centre shaft (14) supporting means extends radially to the stator base. For getting maximum radial stiffness, magnet rings in PMB are arranged in halbach configuration. Rotor magnets are connected in such a way that magnetic field concentrates towards inner cylindrical surface of magnet rings whereas stator magnets are connected in such a way that magnetic field concentrates towards outer cylindrical surface of magnet rings. When rotor and stator magnet stacks relatively misaligned axially, it exerts force on rotor towards shift direction. This phenomenon is taken as advantage herein. Here in FIG. 5 shown that rotor magnet stack is misaligned by distance dx downward with respect to stator magnet stack when rotor rotating above lift-off-speed and is in fully levitated equilibrium condition. The downward force is adjusted to compensate total weight of the system, fully or partially. A major advantage of the present configuration is that weight compensated by PMB reduces load burden on axial levitation system. This reduces induced current in axial levitation coils, and effectively power requirements to levitate vehicle. Eventually it reduces full load current (or power) requirements of propulsion system.

Another advantage of misalignment is that, below lift-off-speed rotor always comes downward making contact of thrust bearing rotor (22) and stator (21) elements. An additional stator element (23) is provided opposite to stator element (21) for upward safety limit of axial displacement of rotor (11).

While rotating above lift-off speed, the propeller blades of rotor (12) generate air lift force on rotor. This force tends to lift rotor (11) upward. Axial levitation force opposes this change and transfers this lift force to the stator body in non-contact manner. This force transfers to the vehicle body connected with the stator of the system, and it stably levitates flying vehicle in air. Generally plurality of such systems is used to design flying vehicle or all electric flight.

The present invention have beneficial advantages which provides a frictionless rotation and levitation of propeller rotor and contact free load transfer of propeller thrust (air generated lift force) to levitate vehicle load. It also provides a pollution free, maintenance free and power efficient solution for higher lift force generation and enhanced flying time for flying vehicles or flights with provided electrical power source. A major advantage of the present configuration is that the Lift-to-drag ratio becomes maximum and current requirements decreases to minimum at operating load conditions.

The invention has been explained in relation to specific embodiment. It is inferred that the foregoing description is only illustrative of the present invention and it is not intended that the invention be limited or restrictive thereto. Many other specific embodiments of the present invention will be apparent to one skilled in the art from the foregoing disclosure. All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

LIST OF REFERENCE NUMERALS

Stator (10)
Inner Cylindrical Surface of Stator (10a)
Rotor (11)
Inner Cylindrical Surface of Rotor (11a)
Outer Cylindrical Surface of Rotor (11b)
Rotor Blades (12)
Central Hub (13)
Centre Shaft (14)
Thrust Bearing Stator (21)
Thrust Bearing Rotor (22)
Additional Rotor Element (23)
PMB rotor magnet rings (31)
PMB stator magnet rings (32)
Cantilevered Winding (41)
Cantilevered Winding (42)
Propulsion Winding (43)
First Array of Magnets (51a)
First Array of Magnets (52a)
Second Array of Magnets (51b)
Second Array of Magnets (52b)
Radial Halbach Array (53)
Axial Levitation System (101)
Axial Levitation System (102)
Radial Levitation System (201)
Radial Supporting system (301)

I claim:

1. A modified magnetic levitation system for flying vehicle comprising:
a stator, a rotor being radially surrounded by the stator with a uniform radial spacing there between;
the rotor having a cylindrical surface being radially surrounded by the stator with a uniform spacing there between, a hollow central hub being concentrically located at the centre of the rotor, a plurality of rotor blades extend from an inner diametric side of a cylindrical surface to an outer diametric side of a cylindrical surface of the hollow central hub;
pairs of halbach arrays being located at upper and lower ends of an outer diametric side of the cylindrical surface of the rotor, respectively, a radial halbach array located at the centre outer diametric side of the cylindrical surface of the rotor, a passive magnetic bearing (PMB) rotor magnet rings halbach array being located at an inner diametric cylindrical surface of the hollow central hub;
the stator includes a propulsion winding circuit being placed at a centre of an inner diametric side of cylindrical surface of the stator, cantilevered windings located at upper and lower ends of the inner diametric side of cylindrical surface of the stator, a central shaft containing a plurality of PMB stator magnet rings being axially extended within the hollow central hub and a central shaft supporting means extends radially to the stator base.

2. The modified magnetic levitation system for flying vehicle as claimed in claim 1, wherein a pair of the halbach arrays is configured in a way that like poles of the halbach arrays align with each other.

3. The modified magnetic levitation system for flying vehicle as claimed in claim 2, wherein each pair of the halbach arrays is comprised of plurality of magnets configured in a cylindrical shape, and halbach array generates a magnetic field having a pole order and said plurality of magnets is a number equal to four times said pole order.

4. The modified magnetic levitation system for flying vehicle as claimed in claim 1, wherein cantilevered closed pack short circuited coil windings is configured in a way that winding plane remains normal to the centre plane of halbach array.

5. The modified magnetic levitation system for flying vehicle as claimed in claim 1, wherein the winding circuit includes two interwoven windings, one is active winding for propulsion of the rotor and another is a closed pack short circuited winding for radial levitation of the rotor.

6. The modified magnetic levitation system for flying vehicle as claimed in claim 1, wherein the radial halbach array includes a plurality of magnets configured in a cylindrical shape, and the radial halbach array generates a magnetic field having a pole order and said plurality of magnets is a number equal to four times said pole order.

7. The modified magnetic levitation system for flying vehicle as claimed in claim 1, wherein the passive magnetic bearing (PMB) magnet rings are arranged in halbach configuration.

8. The modified magnetic levitation system for flying vehicle as claimed in claim 1, wherein the passive magnetic bearing (PMB) stator magnet rings and the passive magnetic bearing (PMB) rotor magnetic rings are axially offset relative to each other.

9. A method for frictionless rotation of rotor and levitation of a flying vehicle via a modified magnetic levitation system including a stator, a rotor being radially surrounded by the stator with uniform radial spacing therebetween; the rotor having a cylindrical surface being radially surrounded by the stator with a uniform spacing there between, a hollow central hub being concentrically located at the centre of the rotor, a plurality of rotor blades extend from an inner diametric side of a cylindrical surface to an outer diametric side of a cylindrical surface of the hollow central hub; pairs of halbach arrays being located at upper and lower ends of an outer diametric side of the cylindrical surface of the rotor, respectively, a radial halbach array located at the centre outer diametric side of the cylindrical surface of the rotor, a passive magnetic bearing (PMB) rotor magnet rings halbach array being located at an inner diametric cylindrical surface of the hollow central hub; the stator includes a propulsion winding circuit being placed at a centre of an inner diametric side of cylindrical surface of the stator cantilevered windings located at upper and lower ends of the inner diametric side of cylindrical surface of the stator, a central shaft containing a plurality of PMB stator magnet rings being axially extended within the hollow central hub and a central shaft supporting means extends radially to the stator base; the method comprising:
  (a) suspending the rotor by axial and radial supporting means during rest position thereof;
  (b) generating a rotating electromagnetic field in the radial gap by supplying alternating electric current to a propulsion winding circuit;
  (c) generating a magnetic force across the radial space by interacting the rotating electromagnetic field with a magnetic field of a radial Hallbach array for frictionless rotation of the rotor;
  (d) achieving a rotational speed of the rotor of at least lift-off speed;
  (e) inducing current in passive windings of axial levitation and radial levitation systems due to relative motion of halbach array magnetic field with respect to the passive windings, and interaction of this induced current with magnetic field of a relative halbach array, eventually generates axial and radial levitation force to put the rotor in inherently stable levitation;
  (f) disconnecting the rotor from the axial supporting means and lifting the rotor shifting upwards in the centre position when the rotor reaches the lift-off speed;
  (g) producing a lift force on rotor due to high speed rotations of propeller blades in vicinity of air, wherein the air generated lift force tries to lift the rotor upward, axial levitation force opposes this change and transfers the lift force to a stator body in non-contact manner; and
  (h) putting the rotor in axially and radially stable levitation by the opposite repulsion forces of the axial levitation system and axisymmetric repulsion force of the radial levitation system, under load conditions.

\* \* \* \* \*